United States Patent
Bernstein et al.

(10) Patent No.: US 9,565,203 B2
(45) Date of Patent: Feb. 7, 2017

(54) SYSTEMS AND METHODS FOR DETECTION OF ANOMALOUS NETWORK BEHAVIOR

(71) Applicant: Cyber-Ark Software Ltd., Petach-Tikva (IL)

(72) Inventors: Ruth Bernstein, Tel-Aviv (IL); Andrey Dulkin, Herzlia (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 109 days.

(21) Appl. No.: 14/540,289

(22) Filed: Nov. 13, 2014

(65) Prior Publication Data

US 2016/0142435 A1    May 19, 2016

(51) Int. Cl.
*G06F 21/56* (2013.01)
*H04L 29/06* (2006.01)

(52) U.S. Cl.
CPC ....... *H04L 63/1441* (2013.01); *H04L 63/1425* (2013.01)

(58) Field of Classification Search
USPC ............ 726/1, 4, 5, 6, 7, 16, 22, 23, 24, 27; 380/247, 250
See application file for complete search history.

(56) References Cited

U.S. PATENT DOCUMENTS

| | | | | |
|---|---|---|---|---|
| 7,103,679 B2 * | 9/2006 | Bonn | ...................... | H04L 41/12 370/254 |
| 8,082,349 B1 * | 12/2011 | Bhargava | ........... | G06Q 30/0185 709/203 |
| 8,082,590 B2 * | 12/2011 | Kim | .................... | G06F 12/1491 711/163 |
| 8,429,708 B1 * | 4/2013 | Tandon | ................... | G06F 21/00 380/247 |
| 8,478,708 B1 * | 7/2013 | Larcom | .................. | G06Q 10/10 706/52 |
| 8,701,167 B2 * | 4/2014 | Kovalan | ............... | G06F 19/321 713/193 |
| 9,213,990 B2 * | 12/2015 | Adjaoute | ........... | G06Q 20/4016 |

(Continued)

FOREIGN PATENT DOCUMENTS

WO    WO 2011/018736    2/2011

OTHER PUBLICATIONS

Official Action Dated Sep. 14, 2015 From the US Patent and Trademark Office Re. U.S. Appl. No. 14/253,945.

(Continued)

*Primary Examiner* — Sayed Beheshti Shirazi

(57) ABSTRACT

There is provided a computer implemented method for detecting anomalous behavior in a network, comprising: receiving data representing at least one network activity, each network activity representing a certain data access event involving certain network entities; extracting from the data the certain network entities involved in the respective network activity; retrieving at least one relevant diversity value from a network behavior model based on the extracted certain network entities, wherein the network behavior model includes at least one diversity value, wherein each respective diversity value represents a certain relationship between at least one network entity and at least one network entity type; calculating an abnormality score for the received network activity based on the retrieved relevant diversity values; and classifying the network activity as anomalous or normal based on the calculated abnormality score.

22 Claims, 10 Drawing Sheets

(56) References Cited

U.S. PATENT DOCUMENTS

| | | | | |
|---|---|---|---|---|
| 2003/0191627 A1* | 10/2003 | Au | G06F 17/2785 | 704/9 |
| 2005/0203881 A1* | 9/2005 | Sakamoto | G06F 21/552 | |
| 2006/0080410 A1* | 4/2006 | Maclarty | H04L 29/06 | 709/220 |
| 2007/0050587 A1* | 3/2007 | Palapudi | G06F 3/0622 | 711/164 |
| 2007/0199068 A1* | 8/2007 | Russinovich | G06F 9/468 | 726/16 |
| 2007/0204257 A1* | 8/2007 | Kinno | G06F 11/28 | 717/100 |
| 2007/0294187 A1* | 12/2007 | Scherrer | G06Q 20/401 | 705/75 |
| 2008/0034424 A1* | 2/2008 | Overcash | G06F 21/55 | 726/22 |
| 2008/0222706 A1* | 9/2008 | Renaud | H04L 63/1408 | 726/4 |
| 2008/0263661 A1* | 10/2008 | Bouzida | H04L 63/1416 | 726/22 |
| 2009/0222304 A1* | 9/2009 | Higgins | G06Q 30/02 | 705/14.16 |
| 2009/0271863 A1* | 10/2009 | Govindavajhala | H04L 63/1433 | 726/23 |
| 2009/0293121 A1* | 11/2009 | Bigus | G06F 21/316 | 726/22 |
| 2010/0037166 A1* | 2/2010 | Chandrasekar | G06Q 30/02 | 715/769 |
| 2010/0135157 A1* | 6/2010 | Kim | H04L 12/2602 | 370/232 |
| 2010/0158220 A1* | 6/2010 | Silverman | H04M 3/42195 | 379/88.22 |
| 2010/0269175 A1* | 10/2010 | Stolfo | G06F 21/55 | 726/22 |
| 2011/0247059 A1* | 10/2011 | Anderson | G06F 21/31 | 726/6 |
| 2011/0257992 A1* | 10/2011 | Scantland | G06Q 10/10 | 705/2 |
| 2012/0005192 A1* | 1/2012 | Bao | G06F 17/30882 | 707/721 |
| 2012/0036255 A1* | 2/2012 | Polsky | G06Q 10/0631 | 709/224 |
| 2012/0163196 A1* | 6/2012 | Jansen | H04L 29/12933 | 370/248 |
| 2013/0007883 A1* | 1/2013 | Zaitsev | G06F 21/567 | 726/24 |
| 2013/0111019 A1* | 5/2013 | Tjew | G06F 15/18 | 709/224 |
| 2014/0033307 A1* | 1/2014 | Schmidtler | H04L 63/1483 | 726/22 |
| 2014/0040170 A1* | 2/2014 | Zheng | H04L 63/1408 | 706/12 |
| 2015/0019658 A1* | 1/2015 | Barrera | H04L 51/16 | 709/206 |
| 2015/0113600 A1* | 4/2015 | Dulkin | H04L 63/10 | 726/4 |
| 2015/0121461 A1* | 4/2015 | Dulkin | H04L 63/1408 | 726/4 |
| 2015/0121518 A1* | 4/2015 | Shmueli | H04L 63/1425 | 726/22 |
| 2015/0304349 A1* | 10/2015 | Bernstein | H04L 63/1425 | 726/22 |
| 2016/0021141 A1* | 1/2016 | Liu | H04L 63/1433 | 726/23 |
| 2016/0034950 A1* | 2/2016 | Schroeder | H04L 63/1441 | 705/14.47 |

OTHER PUBLICATIONS

Notice of Non-Compliant Amendment Dated Feb. 11, 2016 From the US Patent and Trademark Office Re. U.S. Appl. No. 14/058,254.
Official Action Dated Jan. 29, 2016 From the US Patent and Trademark Office Re. U.S. Appl. No. 14/524,145.
Applicant-Initiated Interview Summary Dated Apr. 7, 2016 From the US Patent and Trademark Office Re. U.S. Appl. No. 14/524,145.
Official Action Dated May 5, 2016 From the US Patent and Trademark Office Re. U.S. Appl. No. 14/253,945.
Official Action Dated Aug. 31, 2015 From the US Patent and Trademark Office Re. U.S. Appl. No. 14/058,254.
Communication Pursuant to Rules 70(2) and 70a(2) EPC and Reference to Rule 39(1) EPC Dated May 6, 2015 From the European Patent Office Re. Application No. 14190036.5.
Communication Pursuant to Rules 70(2) and 70a(2) EPC and Reference to Rule 39(1) EPC Dated Apr. 28, 2015 From the European Patent Office Re. Application No. 14187430.5.
European Search Report and the European Search Opinion Dated Mar. 3, 2015 From the European Patent Office Re. Application No. 14190036.5.
European Search Report and the European Search Opinion Dated Feb. 20, 2015 From the European Patent Office Re. Application No. 14187430.5.
Official Action Dated Jun. 17, 2015 From the US Patent and Trademark Office Re. U.S. Appl. No. 14/061,835.
Official Action Dated Jan. 21, 2015 From the US Patent and Trademark Office Re. U.S. Appl. No. 14/061,835.
Cyber-Ark "Application Identity Manager™", Cyber Ark Software, Ltd., Datasheet, 2 P.
Cyber-Ark "Application Password Management", Cyber-Ark Software Ltd., Datasheet, 2 P., Feb. 2007.
Cyber-Ark "Enterprise Password Vault™ 4.5", Cyber-Ark Software Ltd., Brochure, 4 P., Nov. 2007.
Cyber-Ark "On-Demand Privileges Manager™ for Unix/Linux", Cyber Ark Software, Ltd., Datasheet, 2 P.
Cyber-Ark "On-Demand Privileges Manager™ for Windows", Cyber Ark Software, Ltd., Datasheet, 2 P.
Cyber-Ark "On-Demand Privileges Manager™", Cyber-Ark Software Ltd., Brochure, 2 P., Apr. 2010.
Cyber-Ark "Privileged Identity Management 5.0", Cyber-Ark Software Ltd., Brochure, 4 P., Apr. 2009.
Cyber-Ark "Privileged Identity Management Suite 7.0", Cyber-Ark Software, Ltd., PIM Brocure, 4 P.
Cyber-Ark "Privileged Session Management Suite 7.0", Cyber Ark Software, Ltd., PSM Brochure, 4 P.
Cyber-Ark "Privileged Session Manager™", Cyber-Ark Software Ltd., Datasheet, 2 P., Mar. 2009.

* cited by examiner

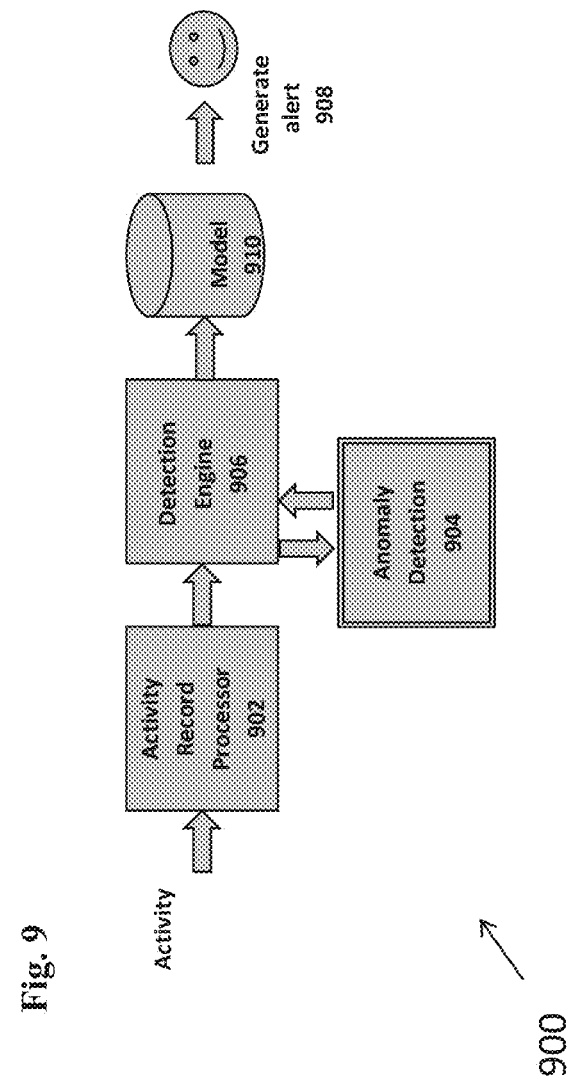

SYSTEMS AND METHODS FOR DETECTION OF ANOMALOUS NETWORK BEHAVIOR

BACKGROUND

The present invention, in some embodiments thereof, relates to systems and methods for detection of anomalous behavior and, more specifically, but not exclusively, to systems and methods for detection of anomalous behavior based on network activity.

Different systems and methods have been developed to detect network security threats. The security threats can originate from activity of a human party, such as a hacker or a malicious insider, and/or from activities of malicious code.

One approach to network security threat detection is termed network behavior anomaly detection (NBAD). NBAD involves learning normal behavior patterns within the network, and continuously monitoring the network for unusual events that do not fit within the learned normal behavior patterns. Examples of network parameters that are monitored to detect abnormal behavior include, traffic volume, bandwidth use, and protocol use. The abnormal behavior is suspicious for malicious activity.

SUMMARY

According to an aspect of some embodiments of the present invention there is provided a computer implemented method for detecting anomalous behavior in a network, comprising: receiving data representing at least one network activity, each network activity representing a certain data access event occurring between certain network entities; extracting from the data representing each respective network activity, the certain network entities involved in the respective network activity; retrieving at least one relevant diversity value from a network behavior model based on the extracted certain network entities, wherein the network behavior model includes at least one diversity value, wherein each respective diversity value represents a certain relationship between at least one network entity and at least one network entity type; calculating an abnormality score for the received at least one network activity based on the retrieved at least one relevant diversity value; classifying the at least one network activity as anomalous or normal based on the calculated abnormality score; and generating an alert when the at least one network activity is classified as anomalous.

Optionally, the at least one network activity is classified as normal when the complete form of the at least one network activity is identified within the network behavior model.

Optionally, the at least one relevant diversity value is retrieved based on matching at least one network entity extracted from the data of the network activity, to at least one diversity value based on the at least one network entity.

Optionally, calculating the abnormality score and classifying the at least one network activity comprises: calculating a first abnormality score using a first combination of relevant diversity values; calculating a second abnormality score using a second combination of relevant diversity values; designating a lower of the first and the second abnormality scores as a minimum score, and designating a higher of the first and the second abnormality scores as maximum score; and at least one member of the group consisting of: classifying the at least one received network activity as normal when the maximum score is below a predefined threshold, classifying the at least one received network activity as anomalous when the minimum score is above the predefined threshold, classifying the at least one received network activity as normal when the average of the minimum and the maximum score is below the threshold, and classifying the at least one received network activity as anomalous when the average of the minimum score and the maximum score is above the predefined threshold.

Optionally, the method further comprises receiving data representing the at least one network activity over a period of time; retrieving, for each respective time slice of multiple time slices of the period of time, at least one relevant diversity value from the network behavior model; generating a diversity time series by organizing the at least one relevant diversity value based on chronological sequence of the respective time slices; receiving a new diversity value representing a next diversity value in the chronological sequence of the diversity time series, the new diversity value calculated based on another received network activity; and analyzing the new diversity value based on the diversity time series to identify the new diversity value as anomalous or normal diversity.

Optionally, the network behavior model includes respective weights assigned to each respective diversity value and the abnormality score is calculated based on the respective weights assigned to each respective diversity value.

Optionally, the retrieving at least one relevant diversity value is dependent on a confidence score associated with the at least one diversity value, the confidence score included in the network behavior model.

Optionally, calculating the abnormality score comprises calculating based on a member selected from a group consisting of: average of the retrieved diversity values, maximum value of the retrieved diversity values, and a weighted average of the retrieved diversity values.

Optionally, calculating the abnormality score comprises calculating the abnormality score from the diversity values based on a function that increases the abnormality score when the retrieved at least one diversity value are relatively lower and decreases the abnormality score when the retrieved at least one diversity values are relatively higher.

Optionally, classifying the at least one network activity as anomalous or normal based on the calculated abnormality score is based on comparing the abnormality score to a predefined threshold.

According to an aspect of some embodiments of the present invention there is provided a computer implemented method for generating a model for detecting anomalous behavior in a network, comprising: receiving data representing multiple network activities, each network activity representing a certain data access event occurring between certain network entities; extracting from the data representing each respective network activity, the certain network entities involved in the respective network activity; calculating at least one diversity value from the network activities, wherein each diversity value represents a certain relationship between at least one network entity and at least one network entity type; generating a network behavior model based on the calculated at least one diversity value; and outputting the network behavior model.

Optionally, the network activities are organized into multiple groups, each group including network activities having at least one shared network entity type, each group represented by a certain word. Optionally, the method further comprises associating a certain context with each respective group. Optionally, the certain context is a member selected from a group consisting of: a number of occurrences of activities within the respective group, a time of first occurrence of activities within the respective group, and a time of last occurrence of activities within the respective group.

Optionally, the method further comprises excluding certain network activities matching a predefined context from the network behavior model. Optionally, the predefined context includes a number of occurrences of the respective network activity within a predefined period of time.

Optionally, the method further comprises calculating a confidence score for each respective diversity value, the confidence score calculated based on a number of activities of a certain network entity in the respective group, or a number of activities of a combination of certain network entities in the respective group, the confidence score included within network behavior model.

Optionally, the method further comprises iterating the extracting, the calculating, and the generating, to update the network behavior model, according to at least one of periodically and when new network activities are received.

Optionally, the method further comprises assigning a weight to each respective diversity value, the weights designated based on a predefined logic defining the significance of each respective diversity value based on interaction between network entities.

Optionally, the network activities are received from at least one member of the group consisting of: monitoring of a network, gathering data from network entities, and obtaining data from a source connected to the network.

According to an aspect of some embodiments of the present invention there is provided a system for detecting anomalous behavior in a network, comprising: an anomaly detecting server in communication with the network, the server configured to: receive data representing at least one network activity within the network, each network activity representing a certain data access event occurring between certain network entities in the network; calculate an abnormality score for the received at least one network activity based on a retrieved at least one relevant diversity value, the at least one relevant diversity value obtained by extracting from the data representing each respective network activity, the certain network entities involved in the respective network activity, and retrieving the at least one relevant diversity value from a network behavior model based on the extracted certain network entities, wherein the network behavior model includes at least one diversity value, wherein each respective diversity value represents a certain relationship between at least one network entity and at least one network entity type; classify the at least one network activity as anomalous or normal based on a calculated abnormality score; and generating an alert when the at least one network activity is classified as anomalous.

Optionally, the anomaly detecting server is further configured to classify the at least one network activity as normal when the complete form of the at least one network activity is identified within the network behavior model.

Optionally, the anomaly detecting server further includes a trend analysis module configured to: receive data representing the at least one network activity over a period of time; retrieve, for each respective time slice of multiple time slices of the period of time, at least one relevant diversity value from the network behavior model; generate a diversity time series by organizing the at least one relevant diversity value based on chronological sequence of the respective time slices; receive a new diversity value representing a next diversity value in the chronological sequence of the diversity time series, the new diversity value calculated based on another received network activity; and analyze the new diversity value based on the diversity time series to identify the new diversity value as anomalous or normal diversity.

According to an aspect of some embodiments of the present invention there is provided a system for generating a model for detecting anomalous behavior in a network, comprising: a learning server in communication with a network, the server configured to: receive data representing multiple network activities within the network, each network activity representing a certain data access event occurring between certain network entities connected to the network; generate a network behavior model based on at least one diversity value calculated from the network activities, wherein each diversity value represents a certain relationship between at least one network entity and at least one network entity type, the certain network entities involved in the respective network activity extracted from the data representing each respective network activity; and output the network behavior model.

Optionally, the learning server is further configured to iterating the generating, to update the network behavior model, according to at least one of periodically and when new network activities are received.

According to an aspect of some embodiments of the present invention there is provided a computer program product for detecting anomalous behavior in a network, comprising: one or more non-transitory computer-readable storage mediums, and program instructions stored on at least one of the one or more storage mediums, the program instructions comprising: program instructions to receive data representing at least one network activity, each network activity representing a certain data access event occurring between certain network entities; program instructions to extract from the data representing each respective network activity, the certain network entities involved in the respective network activity; program instructions to retrieve at least one relevant diversity value from a network behavior model based on the extracted certain network entities, wherein the network behavior model includes at least one diversity value, wherein each respective diversity value represents a certain relationship between at least one network entity and at least one network entity type; program instructions to calculate an abnormality score for the received at least one network activity based on the retrieved at least one relevant diversity value; program instructions to classify the at least one network activity as anomalous or normal based on the calculated abnormality score; and program instructions to generate an alert when the at least one network activity is classified as anomalous.

Optionally, the computer program product further comprises: program instructions to receive data representing multiple network activities, each network activity representing a certain data access event occurring between certain network entities; program instructions to extract from the data representing each respective network activity, the certain network entities involved in the respective network activity; program instructions to calculate at least one diversity value from the network activities, wherein each diversity value represents a certain relationship between at least one network entity and at least one network entity type; program instructions to generate the network behavior model based on the calculated at least one diversity value; and program instructions to output the network behavior model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9 is a block diagram of an exemplary architecture for implementation of an anomaly detection component, in accordance with some embodiments of the present invention.

DETAILED DESCRIPTION

Figure 1:
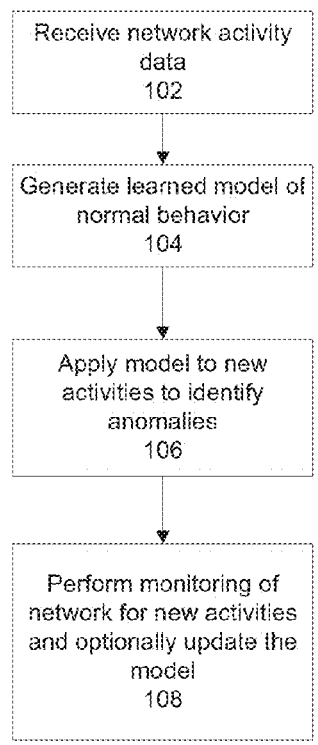
FIG. 1 is a flowchart of a computer implemented method for mapping normal entity relationship based network activity, and applying the learned model to identify anomalous behavior, in accordance with some embodiments of the present invention.

The present invention, in some embodiments thereof, relates to systems and methods for detection of anomalous behavior and, more specifically, but not exclusively, to systems and methods for detection of anomalous behavior based on network traffic.

An aspect of some embodiments of the present invention relates to systems and methods for learning normal network behavior based on an analysis of data access events between network entities, optionally in real time. Examples of network entity types include source machine (i.e., the machine from which network traffic originated), target machine (i.e., the machine to which network traffic is destined), source user (i.e., the connected user on the source machine), and target user (i.e., the user with which actions on target machine are performed). The terms user and user account are herein used interchangeably. Additional examples of entity types include communication protocol, communication port, network address, action performed, user client, and target service. For example, a specific machine on which a specific network activity is performed may be an entity of the target machine entity type. The data access events are mapped based on the particular combinations of relationships of entities and entity types involved in the data access event. The mapping represents normal diversity behavior for each particular combination of entity to entity type relationship. The mapping may be performed by a set of rules, optionally by designating at least one diversity value that represents the respective diversity relationships between entity types.

As described herein, the term diversity means a quantifiable measure representing the extent of relationship between a specific entity or combination of entities, and an entity type or combination of entity types. For example, a diversity may be the number of target machines (wherein target machine denotes the entity type) accessed by a specific user (wherein user denotes the entity) divided by total number of target machines in the network. Another example for diversity may be the number of source machines (wherein source machine denotes the entity type) from which a specific user connected to a specific target machine (wherein target machine and user are a combination of specific entities). Another example of diversity is the number of different source and/or target machines (wherein source machine and target machine are the entity types) accessed by a specific user using a specific protocol (wherein user and protocol are combination of specific entities).

Optionally, each data access event is performed within a certain context, for example, at a certain time, using a certain protocol, and using a certain network access port. The data access events may be further mapped based on the certain context. Data access events of the particular combination are organized according to events that occurred during each certain context, for example, the number of events occurring within a certain period of time. Within each context group, based on the data access events, one or more diversity values (or set of rules) are designated to map the extent of diversity between respective entities in the different types of relationships.

The model represents a baseline of normal behavior for each respective combination of entity to entity type relationship, optionally within a specific context. The mapping, such as the set of rules, optionally the respective diversity functions, may be evaluated to calculate a respective diversity value for the particular entity to entity type relationship combination. Each diversity value represents the extent of relationship between entities and entity types involved in the data access event in the particular context.

Inventors discovered that adopting the diversity approach as described herein, provides unexpected results of improved detection of anomalous network activities, such as detection of anomalous behavior that would otherwise not be possible or difficult to detect with methods other than the diversity based systems and/or methods described herein. Inventors discovered that when a new, previously unknown network activity is received, an examination of the extent of known relationships between network entities involved in this activity is useful to determine how anomalous this network activity is. For example, when the activity describes an access of a specific user to a specific machine, analyzing how many machines this user is known to have accessed in the past (i.e., the diversity of target machines with regards to the specific user) and/or whether or not the user usually accesses many machines then accessing another machine is considered a normal behavior. Furthermore, inventors discovered, for example, the possibility to examine how many users usually access this specific machine (i.e., the diversity of users with regards to the specific machine) and when few users are known to have accessed this machine, then another user accessing this machine is considered anomalous. Inventors discovered that for a specific network activity there may be several relevant diversity values that are retrieved from the model, and used to decide whether the network activity is anomalous or normal, as described herein.

For example, high diversity values of relationship type users per specific machine may be calculated in the case in which many different users access the same server. Many different users accessing the server may then be considered normal behavior.

In another example, low diversity values for relationship type target machine for a specific source machine are calculated in the case in which a certain server periodically communicates mostly with another server, for example, to receive periodic data updates. The normal behavior is based on the certain server mostly communicating with the certain other server (and generally not with different servers). The behavior of the certain server, to contact mostly one other server is defined as low diversity. The low diversity value may be calculated for a certain context, for example, access at a predefined pattern of time such as once a week, or access at any time using any protocol. When the certain server tries to access data at a different server, such as in any context, the activity is flagged as abnormal, falling outside the normal diversity behavior learned as normal behavior.

Optionally, the diversity function represents the diversity of a certain entity instance in relation to another entity type, for example, the diversity of a specific user in relation to the target machines that the user accesses. Alternatively or additionally, the diversity values represent the combination of certain entity instances in relation to one or more other entity types. For example, the diversity of the set of a user and a target machine in relation to source machines, which may be conceptualized as representing the extent to which the user uses different source machines when connecting to the target machine.

Respective diversity values are calculated based on corresponding diversity functions. The diversity value is a calculated property that represents diversity of a certain entity in relation to another entity type during a network action such as a data access event. The diversity value represents the extent of diversity of the behavior of the certain entity in relation to the other entity type. For example, the diversity of a certain user in relation to all known target machines represents the diversity of the usage of different target machines by the certain user.

The qualitative relationship between the entities themselves is learned. For example, learning the machines to which a user normally connects to, in order to initiate examination of activity for abnormality based on receiving a network activity describing an access to a machine to which the user has never connected before.

An aspect of some embodiments of the present invention relates to identifying a new network entity relationship as anomalous based on the learned normal network entity relationship behavior model. Abnormal activity including data access events, which may be malicious or indicative of a system failure, is based on identifying abnormal activity relative to the learned normal behavior of the network entities. The mapping, optionally based on diversity function(s), generalizes observed relationships from the learning phase, to allow for determining when a new unknown entity relationship is abnormal. A deviation extent is calculated for the new relationship relative to the learned relationships.

When a new network activity that does not exist in the model is identified, the new activity is examined against the model. A subset of combinations of relationships of at least one entity participating in the new activity is designated within the model. The subset of relationships, optionally a subset of diversity functions, are evaluated to calculate at least one diversity value. The diversity value is analyzed to determine whether the new network activity is normal or abnormal. Optionally, an abnormality score is calculated based on the diversity value, the analysis being performed based on the abnormality score.

The higher the diversity of the entities involved in the new network activity, the lower the deviation extent of the new activity, and the lower the probability that the new activity represents anomalous activity. The lower the diversity of the entities involved in the new activity, the higher the deviation extent of the new activity, and the higher the probability that the new activity represents anomalous activity.

An aspect of some embodiments of the present invention relates to systems and/or methods for identifying anomalous time related diversity changes based on the model, optionally based on respective diversity values calculated from diversity functions. An extreme variation in the respective diversity value in a certain period is identified as being an anomaly. The anomaly may represent malicious behavior. The time related changes may allow identification of sudden malicious activity occurring using established normal entity relationships, for example, high-jacking of a user account by malicious code that repeatedly accesses a machine the user account usually connected to, in an effort to break into the machine.

Optionally, the anomalous time related change is defined as an extreme value relative to a baseline, for example, an extreme value relative to the average value of the diversity value over a predefined time range, for example, three standard deviations above the six month average.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, entity or network entity means a qualitative component of network activity, for example, the user who performs the action within the activity, or the machine on which the action is performed. An entity type is a category of entities, for example, user and machine. An entity may refer to a specific instance of the entity type, for example, a username of a user (e.g., Rachel), or a specific machine name (e.g., MyHost).

As described herein, the term activity or network activity means one or more data access events performed by one or more entities to one or more other entities in the network. The data access event is performed within a certain context, for example, at a certain time of the day, using a certain port, through a certain intermediate router, having associated a certain secure signature, and using a certain protocol. For example, an activity is an action performed by a user from a source machine on a target machine at a certain time. In another example, an activity is an action performed by a certain user from a certain source machine, on a certain account on a certain target machine using a certain protocol, via a certain port, in a certain time.

As described herein, the term normal behavior means network behavior that is allowed and/or non-malicious. As used herein, the term normal activity is sometimes substituted for the term normal behavior, both having the same meaning.

As described herein, an anomaly is an activity that deviates from the normal learned behavior. The anomaly may be, for example, malicious activity.

As described herein, the term model means a learned model that represents normal behavior.

Figure 2:
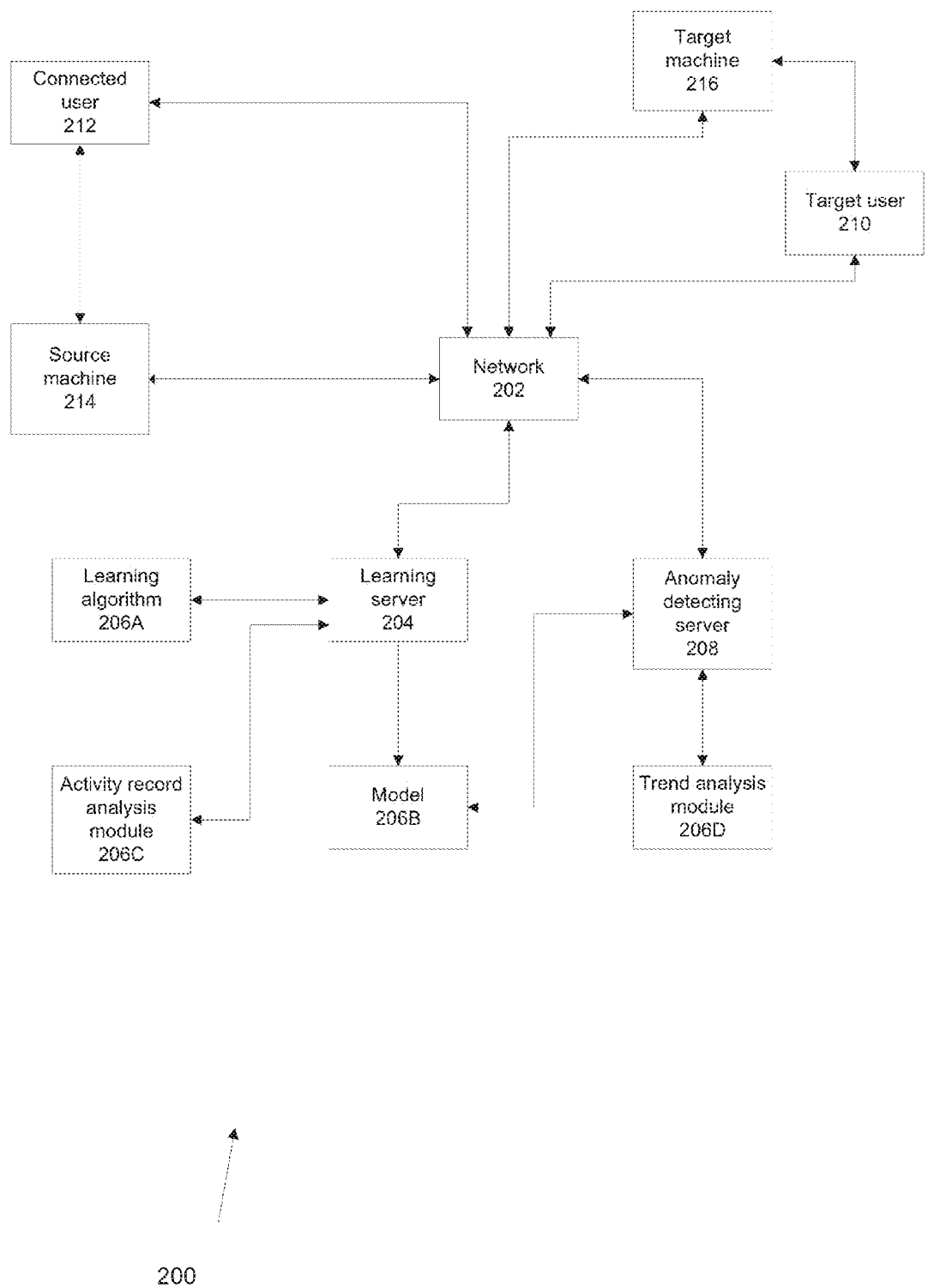
FIG. 2 is a system for mapping normal entity relationship based network activity, and/or applying the learned model to identify anomalous behavior, in accordance with some embodiments of the present invention.

Reference is now made to FIG. 1, which is a flowchart of a computer implemented method for mapping normal entity relationships based on network activity, and applying the learned model to identify anomalies, in accordance with some embodiments of the present invention. Reference is also made to FIG. 2, which is a system for mapping normal entity relationship based network activity, and/or applying the learned model to identify one or more anomalies, in accordance with some embodiments of the present invention.

The systems and/or methods described herein may identify network resources that are vulnerable to attacks based on an analysis of the calculated diversity values associated with each respective resource. For example, machines and/or user accounts that are widely used in different activities might be more exposed to attacks. The diversity values generated by the systems and/or methods described herein may provide experts with the relevant statistics for vulnerability analysis. The diversity values generated by the systems and/or methods described herein may be used for reallocation of monitoring resources, to allocate limited resources to network portions that are deemed to be at higher risk of attack.

The systems and/or methods described herein may identify malicious behavior that would otherwise seem normal to existing security components. The entity based analysis may allow detection of anomalies that appear normal when analyzed based on other non-entity based methods. For example, a user manually trying to access a new machine may be allowed to do so by existing security components, but flagged as an anomaly by the systems and/or methods described herein. In this manner, the systems and/or methods may provide an additional layer of security, by identify malicious behavior in comparison to normal behavior between entities.

The systems and/or methods described herein improving functionality of a computer network (and optionally clients and/or servers of the network) by improving security to prevent shut-downs, tying up of network resources, and/or degradation of network performance. The diversity values may be analyzed to detect security threats which cause the shut-down, use of network resources, and/or degradation of performance. For example, abnormal activity that shuts down computers is reduced or prevented, abnormal activity that ties us network resources such as malicious code accessing bandwidth to repeatedly attempt to break into a host is reduced or prevented, and/or degradation of network performance due to malicious code infected computers is reduced or prevented.

The systems and/or methods described herein improve functionality of a computer network (and optionally clients and/or servers of the network) by detecting a system failure, which might otherwise not be detected or be more difficult to detect. The system failure may be due to, for example improperly written code which may not necessarily be malicious. The diversity values may be analyzed to detect, for example, improperly written code that excessively ties up network resources, such as repeatedly accessing bandwidth to try and connect with a certain server. In another example, the improperly written code accessing another entity across the network ties up processing resources of the source and/or target entities, degrading performance for other normal applications.

Other examples of improvements in network performance based on detection and blocking of the abnormal activity by analyzing diversity values include: improved memory usage by removal of the improper code, improvement in network throughput, latency and/or reliability by blocking of improper network connection access.

System 200 includes a network 202 for communication between different entities, for example, internet, a private network, a wireless network, and a wired network. A learning server 204 receives network activity data from network 202. A learning algorithm 206A stored or in communication with learning server 204 analyzes the network traffic to generate a model 206B of learned normal behavior, which is stored on or in communication with server 204, for example, within a database, repository or other data structure. Additional details of the learning algorithm and model are described herein.

An anomaly detecting server 208 receives network activity data from network 202 to identify anomalous activity. The anomaly detecting server 208 applies learned model 206B to identify the anomalous activity, as described herein. Server 208 may access model 206B stored on learning server 204, or may access a locally stored version of model 206B, for example, transmitted from server 204.

Learning server 204 and anomaly detecting server 208 may be implemented in a single device, component, and/or server. The combined server may provide learning and anomaly detecting functions simultaneously, such as iteratively updating the model while detecting anomalous behavior, as described herein. Alternatively or additionally, learning server 204 and anomaly detecting server 208 are implemented as two distinct servers. For example, learning server 204 generates the model in a central location, and distributes and/or offers access to the model for local anomaly detecting and identification (e.g., at client terminals).

Server 204 and/or server 208 may be implemented as separate pieces of equipment connected to the network, as a software component installed within existing equipment (e.g., within a router, a switch, a bridge, and a server), and/or as a hardware component installed within existing equipment.

Optionally, learning server 204 and/or anomaly detecting server 208 receive network activity data and/or monitor and/or gather relationship data within network 206. The network activities data may be received from various sources, such as, but not necessarily limited to, from a network sensor monitoring the network, gathered from machines in the network, received from another system connected to the network as a list, a file, provided from a database and/or other methods. The data access events may be identified, for example, by intercepting packets transmitted over the network and analyzing the content of the packets for communication sessions and/or data transfer, from modules installed within network elements that transmit messages when data access events are detected at each network element, and/or by monitoring data flow within the network to detect the establishment of data communication sessions.

Optionally, server 204 and/or server 208 collect context data when the data access event(s) have been identified. For example, the time of the access event, the protocol(s) for establishment of the access event, the port(s) for establishment of the access event, and other context data as described herein.

Exemplary and not necessarily limiting entities include:

Target user(s) 210 represents the account on which the action is performed within the activity. Target user 210 is an entity type. As described herein, such as in the examples, the target user entity type is denoted U, whilst a specific target user is denoted Ui.

Connected user 212 represents the user that originates the action within the activity. Connected user is an entity type. As described herein, such as in the examples, the connected user entity type is denoted C, whilst a specific connected user is denoted Ci.

Source machine 214 represents the machine from which the action is originated within the activity. Source machine is an entity type. As described herein, such as in the examples, the source machine entity type is denoted S, whilst a specific source machine is denoted Sj.

Target machine 216 represents the machine on which the action is performed within the activity. Target machine is an entity type. As described herein, such as in the examples, the target machine entity type is denoted T, whilst a specific target machine is denoted Tk.

The systems and methods are described herein with reference to entity types U, S, T, and C, which are exemplary entity types and not necessarily limiting, as additional and/or other entity types may be defined. Moreover, the number of entity types is not limited to 3 or 4 as described herein, as fewer or a larger number of entity types may be defined.

At 102, network activity data is received from network 202.

Optionally, network 202 is monitored. Network 202 may be monitored to detect network activities, based on behavior interactions between different network entities.

Optionally, data related to the context of the received data access event is collected, for example, the number of occurrences of each interaction type per predefined period of time is determined.

Network activity from network 202 is received by learning server 204 to learn normal behavior during an initial learning stage to generate model 206B. Alternatively or additionally, network activity from network 202 is received by learning server 204 to update model 206B with new normal behavior and/or changes in normal behavior. Alternatively or additionally, network activity from network 202 is received by anomaly detecting server 208 to identify anomalous behavior.

Optionally, at 104, a model of normal behavior is learned and generated based on the received network activity, for example, by server 204 applying learning algorithm 206A to generate model 206B, as described herein.

The model takes into account the observed activities, with regards to the relationships between entities which take part in the activities. Optionally, the number of occurrences of the activities and/or other context data are considered. One or more diversity functions of entity relationships are calculated for different entity combinations, as described herein.

Figure 3:
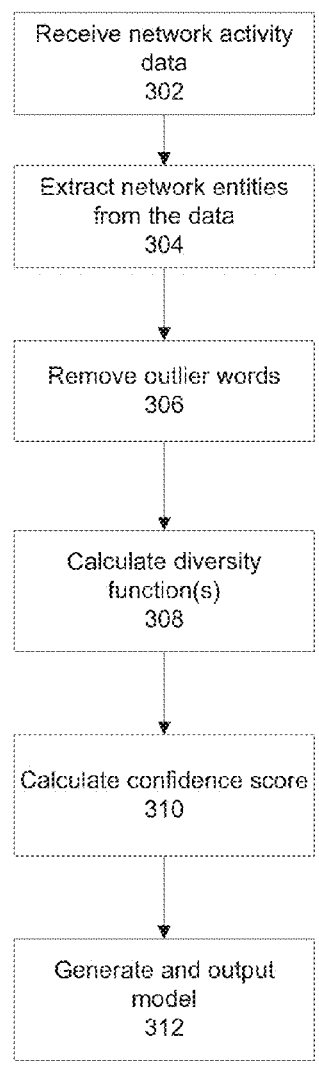
FIG. 3 is a flowchart of a computerized method for generating the mapping for the normal behavior model, in accordance with some embodiments of the present invention.

Reference is now made to FIG. 3, which is a flowchart of a computerized method for generating the normal behavior model, in accordance with some embodiments of the present invention.

Optionally, at 302, network activity data is received, for example, based on network monitoring. The data may be based on one or more monitored network activities. The received data includes information on activities of entities in the network.

At 304, certain network entities involved in each respective network activity are extracted from the received data.

Optionally, the network activity data is parsed to generate one or more activity words for each network activity or a group of network activities, for example, by a parsing module stored on or in communication with learning server 204.

As described herein, an activity word represents a sequence of the entities which take part in the received activity. The received network activities may be translated into a sequence of entities based on each entity type having a unique index. For example, for entities U,S,T, an activity may be translated into the word w=UiSjTk. In another example, for entities U,S,T,C an activity may be translated into the word w=UiSjTkCl. Following the first example, two activities of the entities Ui, Sj and Tk which occurred at different times, are both translated into the same activity word w=UiSjTk.

Optionally, each activity word is associated with a certain context, for example, the number of occurrences of the respective activity in the pre-defined period of time, and/or a timeframe of the first and last activities. Each word may be mapped into a certain context scenario, for example, the number of occurrences and/or the time frame may be mapped and/or stored, for example, based on the relationship:

$$W=\text{Map}\{w_h \rightarrow \text{Count}(w_h), \text{TimeFrame}(w_h)\}$$

where h denotes the running index of the different activity words.

Optionally, at 306, outlier words are removed. Outlier activity words are removed to retain a set of normal allowed activities. The outliers may be removed based on predefined unexpected behavior occurring within the context.

For example, when the context includes a time frame, activity words with number of occurrences which exceed a predefined threshold with the time frame are retained. Alternatively or additionally, activity words with number of occurrences below the predefined threshold are removed. The outlier removal prevents the model from learning statistically insignificant, very rare activities as part of normal behavior.

For the example context of a time frame, the outlier removal and/or retention of normal activity may be defined by the relationship:

$$\overline{W}=\text{Map}\{w_h \rightarrow \text{Count}(w_h), \text{TimeFrame}(w_h) | w_h \in W, \text{Count}(w_h) > \text{Th}\}$$

where Th denotes the threshold for the activity word counters.

At 308, one or more diversity functions are calculated for the various entity-entity type relationships. The diversity functions are calculated for different entity relationships to generate the network behavior model. The diversity functions are calculated for the various entity combinations of entities involved in the network activity.

Optionally, the diversity functions are calculated based on the set of normal allowed activity words designated in block 306, for example, represented by $\overline{W}$.

The plurality of diversity functions are calculated based on combinations of observed relationships of each entity to every other entity. For a case of n entity types the set includes subgroups of sizes 1 to n−1. The combinations include one or more of: a single entity in relation to another single entity, a set of multiple entities in relation to another single entity, a single entity in relation to another set of multiple entities, and a set of multiple entities in relation to another set of multiple entities.

For example, for entity types U (user), S (source machine) and T (target machine), diversity may be calculated for one or more (e.g., all) of the following combinations of a single entity in relation to another single entity: $D_U(T)$, $D_T(U)$, $D_U(S)$, $D_S(U)$, $D_S(T)$, and $D_T(S)$. Herein, $D_U(T)$ denotes the diversity of a specific entity T (target machine) in relation to the entity type U (target users). Diversity may be calculated for a single entity in relation to a set of two or more entity types or a relation of two specific entities to one entity type, such as one or more of the following combinations: $D_U(ST)$, $D_T(US)$, and $D_S(UT)$. Herein, $D_S(UT)$ denotes the diversity of a combination of specific entities U (target user) and T (target machine) in relation to the entity type S (source machine).

In another example, for entity types U, C, S, and T, diversity may be calculated for one or more (e.g., all) of the following combinations of a single entity in relation to another single entity type: $D_U(T)$, $D_T(U)$, $D_U(S)$, $D_S(U)$, $D_T(S)$, $D_S(T)$, $D_C(U)$, $D_U(C)$, $D_C(T)$, $D_T(C)$, $D_C(S)$, and $D_S(C)$. Diversity may be calculated for a set of two entities in relation to an entity type resulting in one or more of the following combinations: $D_U(ST)$, $D_U(CT)$, $D_U(CS)$, $D_C(UT)$, $D_C(ST)$, $D_T(US)$, $D_S(UT)$, $D_T(UC)$, $D_S(CT)$, $D_T(US)$, $D_T(UC)$, and $D_T(CS)$. Diversity may be calculated for a set of three entities in relation to an entity type resulting in one or more of the following combinations: $D_U(CST)$, $D_C(UST)$, $D_S(UCT)$, and $D_T(UCS)$. Diversity may be calculated for a set of two entities in relation to a set of two entity types resulting in one or more of the following combinations: $D_{UC}(ST)$, $D_{US}(CT)$, $D_{UT}(CS)$, $D_{CS}(UT)$, $D_{CT}(UC)$ and $D_{ST}(UC)$. As described herein, for example, $D_U(ST)$ represents the diversity of the combination of specific S (source machine) and specific T (target machine) in relation to the entity type U (target users).

Each diversity function represents a calculated property of a certain entity in relation with another entity type. The calculated property represents diversity of behavior of the certain entity in relation to the other entity type. For example, the Diversity of U1 in relation to T is the diversity of the usage of different target machines by user U1, which may be represented as:

$D_T(U_i)$=function of the number of distinct targets to which $U_i$ has connected For example, the Diversity of U in relation to T is calculated as follows:
Let $\overline{U}$ be the unique U values which appear in any word in $\overline{W}$
Calculate d=distinct function:
For each $U_i \in \overline{U}$
$d_T(U_i)$=Number of distinct T's which appear with $U_i$ in $\overline{W}$ Calculate Maximums over d function:
$d_T\text{Max}=\text{Max}_i\{d_T(U_i), U_i \in \overline{U}\}$ Calculate D=Diversity function:
For each $U_i \in \overline{U}$ $$D_T(U_i) = \frac{d_T(U_i)}{d_T\text{Max}}, d_T\text{Max} > 0$$

In another example, the Diversity value may be calculated for T in relation to U, as follows:
Let $\overline{T}$ be the unique T values which appear in any word in $\overline{W}$
Calculate d=distinct function:
For each $T_k \in \overline{T}$
$d_U(T_k)$=Number of distinct U's which appear with $T_k$ in $\overline{W}$ Calculate Maximums over d function:
$d_U\text{Max}=\text{Max}_k\{d_U(T_k), T_k \in \overline{T}\}$ Calculate D=Diversity function:
For each $T_k \in \overline{T}$ $$D_U(T_k) = \frac{d_U(T_k)}{d_U\text{Max}}, d_U\text{Max} > 0$$

In yet another example, the Diversity of S in relation to U is calculated as follows:
Let $\overline{S}$ be the unique S values which appear in any word in $\overline{W}$
Calculate d=distinct function:
For each $S_j \in \overline{S}$
$d_U(S_j)$=Number of distinct U's which appear with $S_j$ in $\overline{W}$
Calculate Maximums for d function:
$d_U\text{Max}=\text{Max}_j\{d_U(S_j), S_j \in \overline{S}\}$ Calculate D=Diversity function:
For each $S_j \in \overline{S}$ $$D_U(S_j) = \frac{d_U(S_j)}{d_U\text{Max}}, d_U\text{Max} > 0$$

In yet another example, the diversity of the combination UT in relation to S is calculated as follows:
Let $\overline{UT}$ be the unique UT values which appear in any word in $\overline{W}$
Calculate d=distinct function:
For each $U_iT_k \in \overline{UT}$
$d_S(U_iT_k)$=Number of distinct S's which appear with $U_iT_k$ in $\overline{W}$
Calculate Maximums for d function:
$d_S\text{Max}=\text{Max}_{i,k}\{d_S(U_iT_k), U_iT_k \in \overline{UT}\}$ Calculate D=Diversity function:
For each $U_iT_k \in \overline{UT}$ $$D_S(U_iT_k) = \frac{d_S(U_iT_k)}{d_S\text{Max}}, d_S\text{Max} > 0$$

Optionally, one or more (e.g., each) of the diversity functions are assigned a predefined weight. Different functions representing different entity combinations may be assigned different weights. The weight may represent significance of the interaction between the respective entities. For example, $D_T(U)$ may have a larger weight than $D_T(S)$, such as based on the hypothesis that the relationship between a user and a target machine is more significant than the relationship between source machine and target machine. The weights assigned to diversity function combinations are designated herein as $w_{D1}, w_{D2}, \ldots, W_{Dm}$.

The weights may be selected manually by an administrator (e.g., expert knowledge) and/or automatically by a software module (e.g., based on a set of rules). For example, weights may be assigned based on the protocols used by the activities over the network and/or entities performing the activities. Protocols having greater likelihood of being used for malicious activity may have greater weight. In another example, weight may be assigned based on access ports. Ports having greater likelihood of being used for malicious activity may have greater weight.

Optionally, at 310, respective confidence intervals and/or confidence scores are calculated. The confidence intervals may be calculated after processing based on blocks 304-308, simultaneously during processing of blocks 304-308, and/or sequentially after processing of each individual block (i.e., perform block 306, and calculate weights for the words, then perform block 308 and calculate confidence levels for the diversity values).

Calculation of the confidence score for respective diversity values is based on the weights assigned to the activity words. Weights for each respective activity word are calculated and/or pre-defined weights are assigned. Weights may be based on, for example, the number of occurrences of the respective word in the learning data, and/or the duration of a time frame between a first and a last occurrence of the word.

The weights may be assigned to the parsed words (as in block 304), and/or to the set of identified normal words after removal of outlier (as in block 306).

Weight calculation for the activity words may be defined as:

$\overline{W}=\text{Map}\{w_h \to \text{Weight}(w_h) | w_h \epsilon \overline{W}\}$ For each diversity value based on a respective function of the multiple diversity functions calculated in block 308 for each entity or entity combination involved in respective activity word, a respective confidence level is calculated based on the weight assigned to the respective word.

For example, respective weights for the diversity of U in relation to T are calculated as follows:

Let $\overline{U}$ be the unique U values which appear in any word in $\overline{W}$ Calculate d=distinct function, c=weight function: For each $U_i \epsilon \overline{U}$:

$d_T(U_i)$=Number of distinct $T$'s which appear with $U_i$ in $\overline{W}$ $c_T(U_i)=\Sigma_h \text{Weight}(w_h), U_i$ appears in $w_h$ Calculate Maximums over d function, c function:

$d_T\text{Max}=\text{Max}_i\{d_T(U_i), U_i \epsilon \overline{U}\}$ $c_T\text{Max}=\text{Max}_i\{c_T(U_i), U_i \epsilon \overline{U}\}$ Calculate D=Diversity function, C=Confidence function: For each $U_i \epsilon \overline{U}$ $$D_t(U_i) = \frac{d_T(U_i)}{d_T\text{Max}}, d_T\text{Max} > 0$$

-continued $$C_T(U_i) = \frac{c_T(U_i)}{c_T\text{Max}}, c_T\text{Max} > 0$$

The generated model may include the confidence level and/or confidence score. The confidence scores may be applied as part of the model to identify abnormal behavior, as described herein.

At 312, a network behavior model is generated based on the calculated diversity values, and the generated model is outputted. The generated model may be stored (e.g., on a memory in communication with server 204, and/or on remote server) and/or transmitted (e.g., to multiple clients, to a remote server, to anomaly detecting server 208). The general model is provided for receiving network activity data from the network to identify abnormal activity. The model may optionally be stored in a database, and/or as a file in file storage.

Optionally, the model includes one or more of: the observed activities (i.e., the activity words), the normal activities (i.e., the set of words after outlier removal), and/or the diversity functions (i.e., one or more of the possible combinations).

An exemplary model structure is described below. For clarity, the example depicts data structures for 3 entity types, but is not necessarily limited to 3 as other greater numbers of entity types may be used, or 2 entity types may be used. The model below may be modified based on the number of entity types. For example, in the case of 4 entity types, subgroups of up to size 3 may be used. In the general case of n entity types, subgroups of up to size (n−1) may be used.

The exemplary model structure includes one or more of the following:

A map of the observed activity words, optionally with respective context:

$W=\text{Map}\{w_h \to \text{Count}(w_h), \text{TimeFrame}(w_h)\}$

A map of the normal activity words, optionally with respective context:

$\overline{W}=\text{Map}\{w_h \to \text{Count}(w_h), \text{TimeFrame}(w_h) | w_h \epsilon W, \text{Count}(w_h) > \text{Th}\}$ For entity types with a subgroup of size 1, a map of the unique U's to respective diversity values of (T, S):

$\overline{U}=\text{Map}\{U_i \to (D_T(U_i), D_S(U_i))\}$

For entity types with a subgroup of size 1, a map of the unique S's to respective diversity values of (U, T):

$\overline{S}=\text{Map}\{S_j \to (D_U(S_j), D_T(S_j))\}$

For entity types with a subgroup of size 1, a map of the unique T's to respective diversity values of (U, S):

$\overline{T}=\text{Map}\{T_k \to (D_U(T_k), D_S(T_k))\}$

For entity types with a subgroup of size 2, a map of the unique US combinations to respective diversity value of T.

$\overline{US}=\text{Map}\{U_i S_j \to D_T(U_i S_j)\}$

For entity types with a subgroup of size 2, a map of the unique UT combinations to respective diversity value of S.

$\overline{UT}=\text{Map}\{U_i T_k \to D_S(U_i T_k)\}$

For entity types with a subgroup of size 2, a map of the unique ST combinations to respective diversity value of U.

$\overline{ST}=\text{Map}\{S_j T_k \to D_U(S_j T_k)\}$

The complete model of the above data structures may be represented as:

$$\text{Model } M = \{W, \overline{W}, U, S, T, \overline{US}, \overline{UT}, \overline{ST}\}$$

It is noted that the diversity function based systems and/or methods are not limited to security analysis to identify malicious behavior based on identified anomalous behavior, as described herein. The systems and/or methods may be implemented for other network applications, for example, network optimization, and/or user behavior studies. The diversity function, such as the trend analysis described herein, may be studied to improve network optimization, by studying interaction patterns between entities. Interactions between user entities and/or between users and other entities may be studied using the diversity function to understand user behavior.

Referring back to FIG. 1, at 106, the general model learned and generated with reference to block 104 is applied to received network activity to identify one or more anomalies, for example, by anomaly detecting server 208. New activities in the network are analyzed based on the learned model to identify anomalies. The anomalies may represent malicious behavior.

Figure 4:
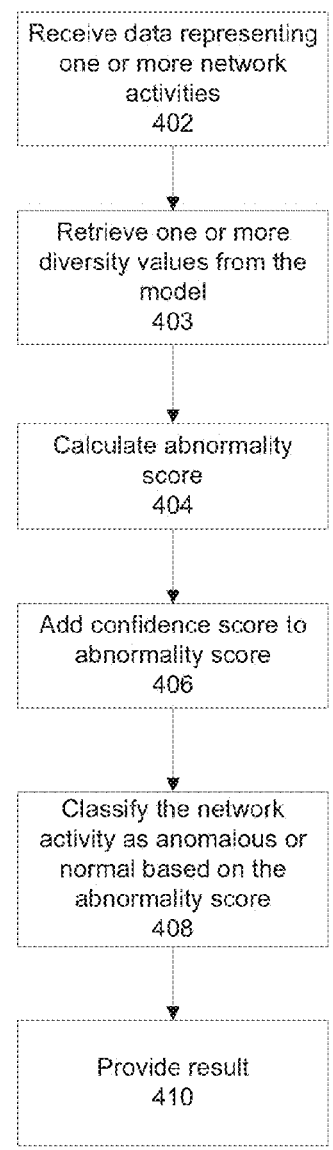
FIG. 4 is a flowchart of a computer implemented method for analyzing network activity to identify anomalous behavior or normal behavior, in accordance with some embodiments of the present invention.

Reference is now made to FIG. 4, which is a flowchart of a computer implemented method for analyzing network activity to identify anomalous behavior or normal behavior, in accordance with some embodiments of the present invention. The method of FIG. 4 is executed for block 106 of FIG. 1, for example, by anomaly detecting server 208. The method calculates an abnormality score for a new received network activity. The abnormality score reflects the extent to which the new activity deviates from normal behavior. The abnormality score is calculated based on the respective diversity values of the entities of the activity, based on the model. The abnormality score has an inverse relationship with diversity values of respective entities taking part in the new activity. The more diverse the entities which take part in the new activity, the lower the calculated abnormality score. The less diverse the entities which take part in the new activity, the higher the calculated abnormality score. The abnormality score may then be analyzed to determine whether the new activity is an abnormality or normal, for example, by comparing the abnormality score to a predefined threshold.

At 402, data representing one or more network activities is received. Each network activity represents a certain data access event occurring between certain network entities.

A new entity based network activity is identified. Identifying the new entity based network activity is based on identifying a new activity word that does not exist within the network behavior model. When the activity word exists in the same manifestation in the normal activity model, the respective activity word is considered normal behavior. When the activity word does not exist at all in the normal activity model, or one or more variations of the activity word exist, the abnormality score is calculated for the respective activity word. The abnormality score is calculated to determine whether the new activity word represents normal or abnormal behavior.

The activity word that is not present in the model is generated and/or received, for example, by anomaly detecting server 208. The activity word represents a new type of activity not previously observed within the network.

Received network activities translated into words are analyzed to determine when the respective activity word already exists within the network behavior model. The analysis may be performed by an activity record analysis module 206C stored on in communication with anomaly detecting server 208 and/or learning server 204, for example, by looking up the respective activity word in a dataset of existing words to determine whether the word is present in the dataset or not. Details of generating the activity word are provided with reference to blocks 302 and 304 of FIG. 3.

At 403, one or more relevant diversity values are retrieved from the network behavior model, based on the extracted certain network entities, as described herein.

At 404, an abnormality score is calculated for the activity word. The abnormality score represents the extent to which the new network activity deviates from normal allowed behavior. The abnormality score is calculated based on the method described with reference to FIGS. 5A and/or 5B, which is a computer implemented method for calculation of the abnormality score, in accordance with some embodiments of the present invention. The abnormality score is calculated based on the learned network behavior model representing normal network activity.

Figure 5A:
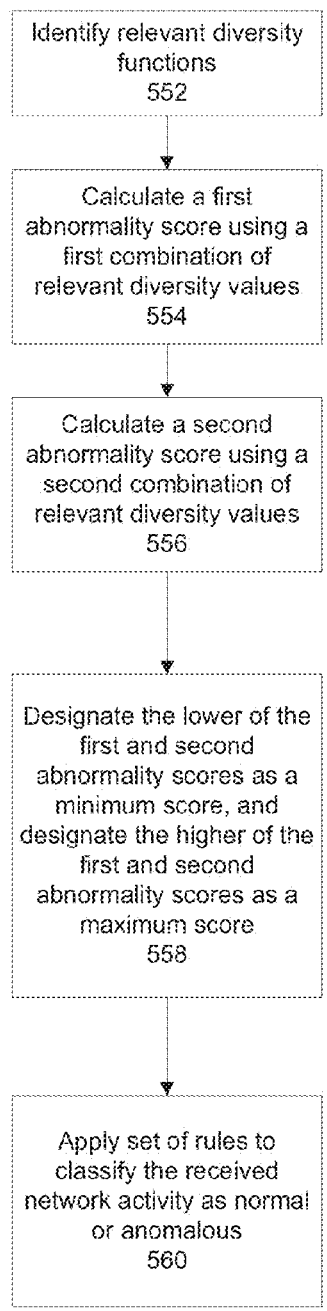
FIG. 5A is a flowchart of a computer implemented method for calculation of an abnormality score used to identify anomalous behavior, in accordance with some embodiments of the present invention.

Reference is now made to FIG. 5A, which is a flowchart of a computer implemented method for calculation of an abnormality score used to identify anomalous behavior, in accordance with some embodiments of the present invention. The method is described in general principles. An example of certain calculation methods are described with reference to FIG. 5A.

Figure 5B:
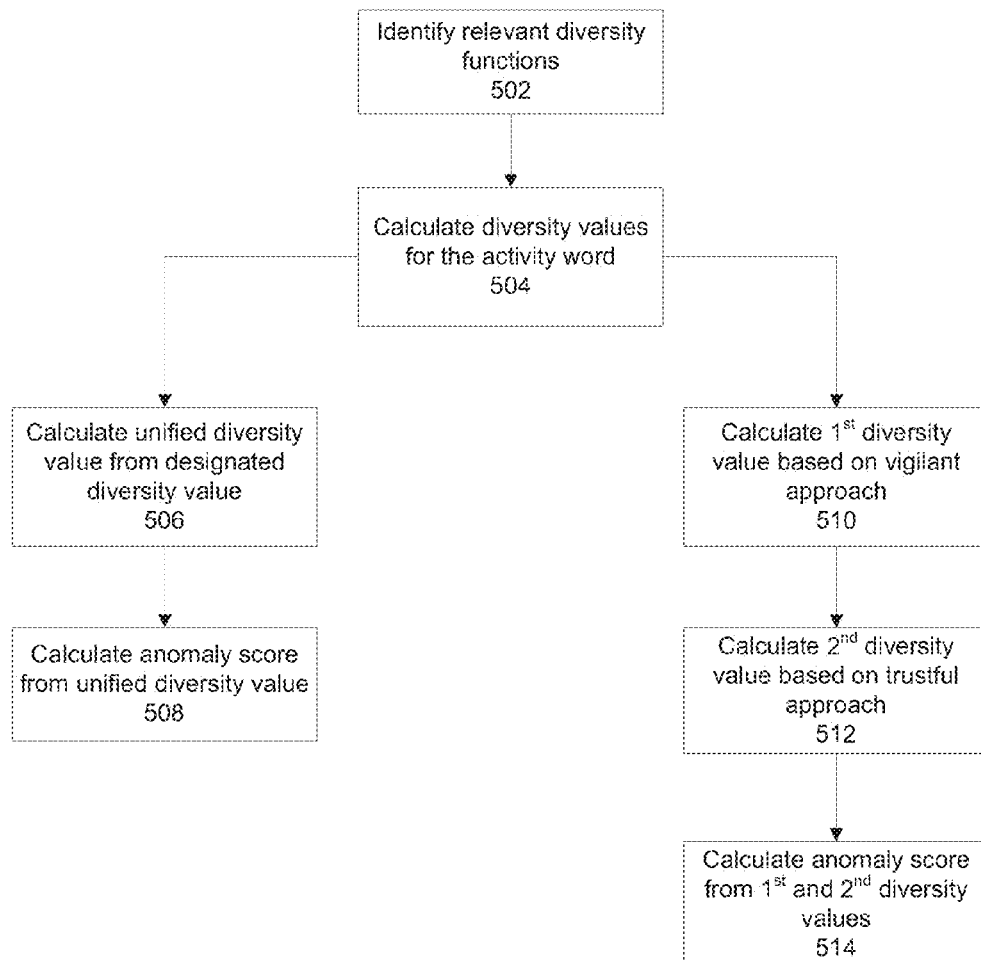
FIG. 5B is a flowchart of an example of a computer implemented method for calculation of an abnormality score used to identify anomalous behavior based on the method of FIG. 5A, in accordance with some embodiments of the present invention.

Reference is now made to FIG. 5B, which is a flowchart of an example of a method based on the method of FIG. 5A, in accordance with some embodiments of the present invention.

At 552, a subset of combination of relevant diversity functions (or other mapping techniques, such as a set of rules) are identified for the received new activity word based on the learned model. Optionally, multiple diversity functions are identified, each respective diversity function based on a certain combination of known entities interacting with unknown entities included in the new activity word. Alternatively or additionally, each of the diversity functions is based on a certain combination of one or more unknown entities interacting with one or more unknown entities included in the new activity word.

For example, for entity types U, S, and T, and diversity functions $D_T(U)$, $D_U(S)$, $D_S(UT)$ the diversities can be designated based on the table below, where x denotes designating the respective diversity function, and 0 denotes not designating the respective diversity function:

| | | | $D_T(U)$ | $D_U(S)$ | $D_S(UT)$ |
|---|---|---|---|---|---|
| | $U_i S_j T_k \in W$ | | 0 | 0 | 0 |
| $U_i S_j T_k \notin W$ | $U_i T_k \in \overline{UT}$ | $U_i S_j \in \overline{US}$ | 0 | 0 | x |
| $U_i S_j T_k \notin W$ | $U_i T_k \in \overline{UT}$ | $U_i S_j \notin \overline{US}$ | 0 | x | x |
| $U_i S_j T_k \notin W$ | $U_i T_k \notin \overline{UT}$ | $U_i S_j \in \overline{US}$ | x | 0 | 0 |
| $U_i S_j T_k \notin W$ | $U_i T_k \notin \overline{UT}$ | $U_i S_j \notin \overline{US}$ | x | x | 0 |

The $1^{st}$ row depicts the case in which the activity word is found in the normal behavior model in its exact form, and therefore defined as representing normal behavior. In this case the abnormality score is not calculated, and none of the diversity functions are designated.

The $2^{nd}$ row depicts the case in which the pair $U_i T_k$ is normal but $U_i S_j T_k$ is not normal. The diversity of $U_i T_k$ in relation to entity type S is informative. Diversity function $D_S(U_i T_k)$ is designated.

The 3$^{rd}$ row is similar to the 2$^{nd}$ row, with the information that U$_i$S$_j$ is not normal. In this case, the diversity of S$_j$ in relation to entity type U is informative. Diversity function D$_U$(S$_j$) is designated.

The 4$^{th}$ row shows the case in which U$_i$T$_k$ is not normal. In this case, the diversity of U$_i$ in relation to entity type T is interesting. Diversity function D$_T$(U$_i$) is designated.

The 5$^{th}$ row is similar to the 4$^{th}$ row, adding that U$_i$S$_j$ is not normal. Similarly to the case in the 3$^{rd}$ row, D$_U$(S$_j$) is designated.

At 554, a first abnormality score is calculated using a first combination of relevant diversity values.

At 556, a second abnormality score is calculated using a second combination of relevant diversity values.

At 558, the lower of the first the second abnormality scores is designated as a minimum score. The higher of the first and the second abnormality scores is designated as a maximum score.

At 560, a set of rules is applied to the maximum and minimum scores, to classify the received network activity as normal or anomalous.

Examples of the set of rules, include one or more of:
classifying the received network activity as normal when the maximum score is below a predefined threshold;
classifying the received network activity as anomalous when the minimum score is above the predefined threshold;
classifying the received network activity as normal when the average of the minimum and the maximum score is below the threshold; and/or
classifying the received network activity as anomalous when the average of the minimum score and the maximum score is above the predefined threshold.

Reference is now made to FIG. 5B, which is a flowchart of an example of a method based on the method of FIG. 5A, in accordance with some embodiments of the present invention.

Optionally, at 502, the subset of combination of relevant diversity functions (or other mapping techniques, such as a set of rules) are identified for the received new activity word based on the learned model, as described with reference to block 552 of FIG. 5A.

Optionally, at 504, one or more diversity values are calculated based on the respective designated diversity functions, such as by evaluating each respective diversity function.

Optionally, at 506, a unified diversity value is calculated from the diversity values. The unified diversity value may be calculated based on one or more methods described herein, or other suitable methods.

Optionally, the unified diversity value is calculated based on an average of the diversity values. The average method may be selected, for example, when average behavior is of interest. The average is represented, for example, by the relationship:

$$\hat{D} = \frac{1}{n}\sum_{i=1}^{n} D_i$$

Alternatively or additionally, the unified diversity value is calculated based on a maximum value of the diversity values. The maximum value method may be selected, for example, when extreme behavior is of interest. The maximum value is represented, for example, by the relationship:

$$\hat{D}=\text{Max}_{i=1\ldots n}\{D_i\}$$

Alternatively or additionally, the unified diversity value is calculated based on a weighted average of the selected diversity values. The weights may denote the different significances of diversity function types, for example, as described with reference to FIG. 3. The weight method may be selected, for example, when different functions have different significance to behavior. The weights assigned to different diversity functions are represented herein as $w_{D1}$, $w_{D2}$, ..., $w_{Dm}$. The weighted average may be represented by the relationship:

$$\hat{D} = \sum_{i=1}^{n} w_{Di} D_i$$

Optionally, at 508, the abnormality score is calculated from the unified diversity value calculated with reference to block 506. Optionally, the abnormality score is calculated from the unified diversity value based on a function that increases the abnormality score when the unified diversity value decreases, and/or decreases the abnormality score when the unified diversity value increases.

An example of a score function is represented by the relationship:

$$\text{Score}=1/b\hat{D}$$

where b is a parameter, b>1

The calculated abnormality score is used to determine whether the respective activity is anomalous or normal, as described below with reference to block 408.

Alternatively or additionally to block 506, at block 510, a first designated diversity value is calculated based on a vigilant approach. The vigilant approach is designed as a cautious approach, that a small or any indication of abnormality is to be flagged, for example, generate excessive warnings of abnormal behavior even when many of the warnings are false (i.e., non-malicious behavior).

Optionally, the minimal diversity value of the respective diversity values is designated to represent the deviation extent of the activity, for example, represented by the relationship:

$$\hat{D}_1=\text{Min}_{i=1\ldots n}\{D_i\}$$

Optionally, at 510, a second designated diversity value is calculated based on a trustful approach. The trustful approach is designed based on the presumption that most activities are normal, and that most abnormal activities are non-malicious allowed activities, for example, a user accessing a new machine for the first time in a normal manner. When there are enough indicators that the activity is normal, the activity should not be flagged as abnormal. The trustful approach is designed to flag abnormalities based on highly abnormal behavior, to detect only those abnormalities that fall far from the normal pattern.

Optionally, the second diversity value is calculated based on the average value of all the relevant diversity values. The average value represents the deviation extent of the activity. As such, diversities with a relatively high value (i.e., corresponding low abnormality score based on the inverse relationship described herein) lower the average, and smoothen the effect of any low diversity values which may be included in $\{D_i\}$. The second diversity value may be calculated based on the relationship:

$$\hat{D}_2 = \frac{1}{n}\sum_{i=1}^{n} D_i$$

Optionally, at 514, the abnormality score is calculated based on the first designated diversity value (of block 510) and the second designated diversity value (of block 512). Optionally, the abnormality score includes a minimum abnormality score and a maximum abnormality score. The maximum and minimum abnormality scores may be calculated, for example, based on the following method:

The maximum value of the set of the first and second designated diversity values is identified. The minimum value of the set of the first and second unified diversity values is identified. The minimum and maximum values may be represented by the relationships:

$$\hat{D}_{max} = \text{Max}\{\hat{D}_1, \hat{D}_2\}$$

$$\hat{D}_{min} = \text{Min}\{\hat{D}_1, \hat{D}_2\}$$

Optionally, the maximum and minimum abnormality scores are calculated from the unified diversity value based on a function that increases the abnormality scores when the unified diversity value decreases and decrease the abnormality scores when the unified diversity value increase.

An example of the score function to calculate the maximum and minimum abnormality scores is represented by the relationship:

$$\text{Score}_{min} = 1/b\hat{D}_{max}$$

$$\text{Score}_{max} = 1/b\hat{D}_{min}$$

b is a parameter, b>1

Referring now back to FIG. 4, optionally, at 406, a confidence score and/or confidence interval is calculated for the respective abnormality score. The confidence score may refine the abnormality score.

Optionally, the confidence score is calculated based on the number of occurrences of activities that take part in the diversity calculation.

Optionally, the confidence score is calculated based on data within the network behavior model. The model may include respective confidence levels for each diversity value. The confidence level may be added to the abnormality score to identify the anomalous behavior, for example, an abnormality score within a certain range based on the confidence level may be defined as anomalous behavior.

Respective confidence scores from the normal network behavior may be added to the corresponding calculated abnormality score by calculation of a unified confidence score, based on integration of confidence scores of diversity values.

$$\hat{C} = \frac{1}{n}\sum_{i=1}^{n} C_i$$

The calculated abnormality score (i.e., block 508 of FIG. 5B) and/or the calculated minimum and maximum abnormality scores (i.e., block 514 of FIG. 5B) may be refined based on the calculated unified confidence score, for example, based on the relationship:

$$\text{Score} = \text{Score} * \hat{C}$$

At 408, the network activity is classified as anomalous or normal based on the calculated abnormality score. The calculated abnormality score (i.e., block 508 of FIG. 5B) and/or the calculated minimum and maximum abnormality scores (i.e., block 514 of FIG. 5B), with optional respective confidence score, are analyzed to determine whether the activity word is associated with normal behavior or anomalous behavior.

Optionally, the abnormality score is compared against a predefined threshold to determine whether the activity is related to anomalous behavior or normal behavior. An example of a method for evaluating the abnormality score includes:

if AbnormalityScore(activity)>AbnormalityScoreThreshold then activity is anomalous
    else activity is normal Alternatively or additionally, the maximum and minimum abnormality scores are evaluated against the threshold. Optionally, the activity is defined as being associated with normal activity when the minimum score is below a predefined threshold. Alternatively or additionally, the activity is defined as being associated with anomalous behavior when the maximum score is above a predefined threshold. Alternatively or additionally, the activity is defined as being associated with anomalous behavior when the minimum scoreless the predefined threshold, is greater than the predefined threshold less the maximum score. For example, the maximum and minimum abnormality scores are evaluated based on the method:

if $\text{Score}_{Min} \leq$ Threshold then activity is normal
    else if $\text{Score}_{Max} >$ Threshold then activity is anomalous else if ($\text{Score}_{Min}$-Threshold)>(Threshold-$\text{Score}_{Max}$)

then activity is anomalous

At 410, the result indicative of normal behavior or anomalous behavior is provided, for example, as a network message transmitted to another module, stored on a memory, and/or generated as a signal for further processing.

Optionally, when the activity is identified as being related to anomalous behavior, an alarm and/or other event is sent to the originating client, a management server, and/or other controller which may take further action to investigate and/or prevent further malicious activity.

At 108, the network activities are continuously received, for example, by anomaly detecting server 208 and/or learning server 204, which may communicate with each other. For example, learning server 204 may receive network activity data from the network to update model 206B. Anomaly detecting server 208 may analyze new activities based on the updated model 206B.

Figure 6:
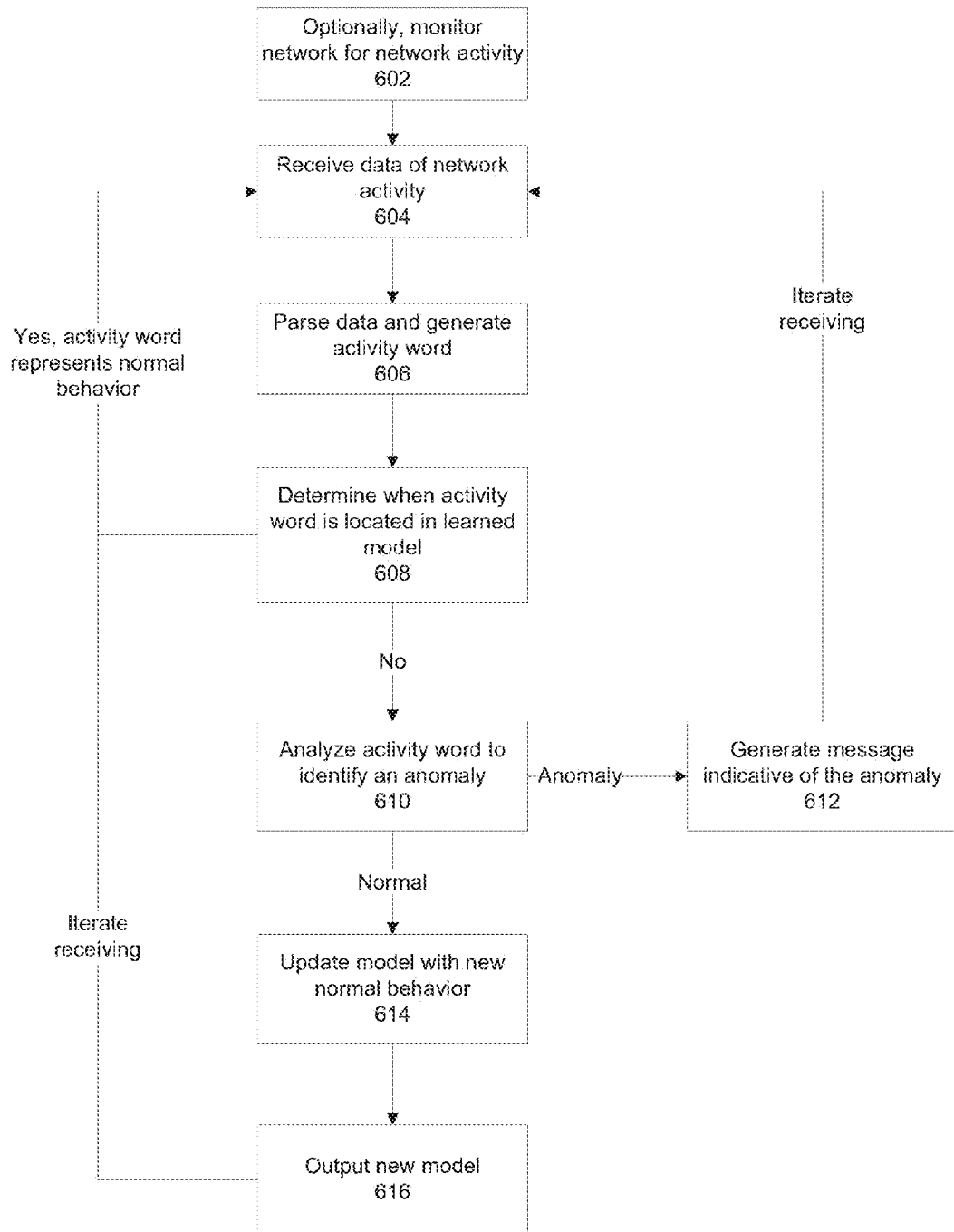
FIG. 6 is a flowchart of a computer implemented method for receiving network activity data from a network to detect new activities based on entity relationship, in accordance with some embodiments of the present invention.

Reference is now made to FIG. 6, which is a flowchart of a computer implemented method for receiving network activity data, in accordance with some embodiments of the present invention. New normal activities are distinguished from anomalous activities. When the new normal activity is identified, the model is updated with the data related to the new normal activity, by mapping the new activity to the model, optionally by re-calculating the diversity functions based on the new activity. When the new activity is identified as being anomalous, an event and/or message is generated, as described herein.

Optionally, at 602, network activity data is received from network 202, for one or more activities based on entity relationships.

At 604, data related to the network activity is extracted for processing, for example, as described with reference to block 302 of FIG. 3.

At 606, the extracted data is parsed to generate one or more activity words, for example, as described with reference to block 304 of FIG. 3. Optionally, outliers are removed, for example, as described with reference to block 306 of FIG. 3.

At 608, the activity word is evaluated to determine whether the activity word exists within the learned model, or whether the activity word (in its entirety or portions of the word) is new for example, as described with reference to block 402 of FIG. 4.

Optionally, when the activity word is found within the learned model, the related activity is determined to be associated with normal behavior. Receiving network activity data as in block 604 may continue to identify additional activities.

Alternatively, at 610, when the activity word is not found in the learned model, the activity word is evaluated to determine whether the new activity word represents an anomaly or represents normal behavior. The activity word is analyzed based on the method described with reference to FIG. 4.

Optionally, at 612, when the activity word is determined to represent an anomaly, an alarm and/or alert message is generated, as described herein. Receiving network activity data as in block 604 may continue to identify additional activities.

Alternatively, at 614, when the activity word is determined to represent a new normal activity, the learned model is updated to incorporate the new normal activity.

At 616, the updated model is generated. The updated model may be used to evaluate subsequent received network activity data activities, for example, in block 608.

Receiving network activity data as in block 604 may continue to identify additional activities.

Figure 7:
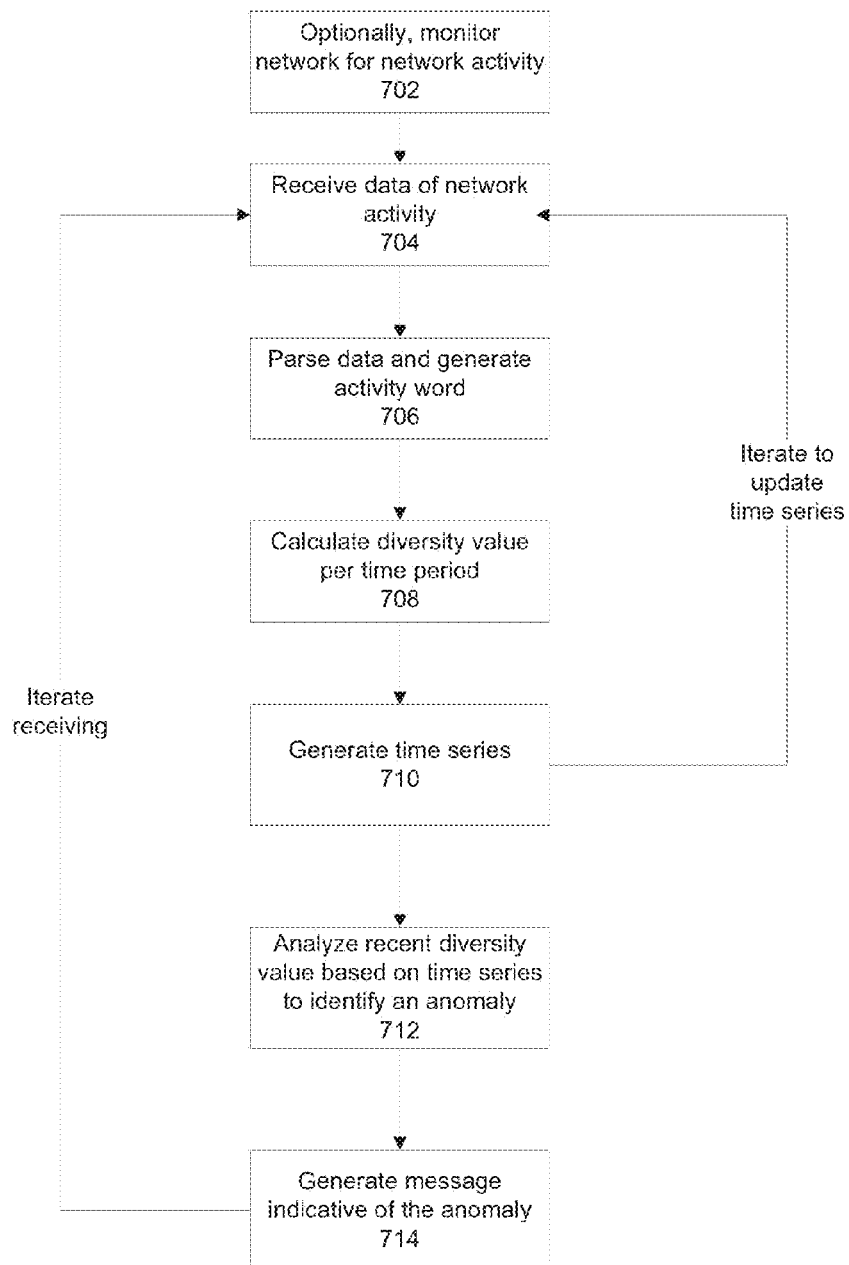
FIG. 7 is a flowchart of a computer implemented method for identifying one or more anomalous changes in diversity over time, in accordance with some embodiments of the present invention.

Reference is now made to FIG. 7, which is a flowchart of a computer implemented method for identifying one or more anomalous changes in diversity over time, in accordance with some embodiments of the present invention. The method may be executed, for example, by a trend analysis module 206D stored on and/or in communication with anomaly detecting server 208 and/or learning server 204. For example, blocks 704-710 are executed by learning server 204 to learn normal diversity value patterns over time. Block 702 may be executed by the learning server and/or an external network monitoring system. Block 712 is executed by trend analysis module 206D of anomaly detecting server 208 to evaluate a new activity based on the learned model.

The diversity values are calculated based on the normal network activity model using respective diversity functions, as described herein.

Optionally, at 702, network activity data is received over a period of time, to identify one or more entity based network activity sessions. The received network activity data is divided into time slices for obtaining samples of the network behavior. The time slices may be predefined, for example, every hour, every day, or every week.

At 704, data related to the network activity is extracted for processing, for example, as described with reference to block 302 of FIG. 3.

At 706, each of the entity based network activity sessions is parsed to generate a respective activity word, for example, as described with reference to block 304 of FIG. 3. Optionally, outliers are removed, for example, as described with reference to block 306 of FIG. 3.

At 708, for each of the entities or entity combinations involved in these activity words, one or more diversity values are calculated based on respective diversity functions, as described herein, for example, as described with reference to block 308 of FIG. 3. Respective diversity values are calculated for each time slice.

At 710, the diversity values are arranged as a diversity time series based on chronological order of the related times slices. The diversity time series may be included within the trained model.

For example, given activities which occurred over a time frame of 6 months, calculate the weekly diversities of all entities. Each week is denoted by an index $t_j$, $j=1, \ldots, m$. Weeks are indexed according to chronological date, i.e. when week k occurs before week l, then tk<tl. For a certain entity $U_i$, the calculated diversity related to the entity type T may be represented as below, where the diversity values are treated as a time series, where tj is the temporal index:

$$D_T^{t1}(U_i), D_T^{t2}(U_i), \ldots, D_T^{tm}(U_i)$$

Blocks 704-710 may be repeated over time to generate the time series. The time series may be iteratively re-calculated and/or updated, for example, as a sliding window, and/or when a certain time has expired. The time length may be, for example, about 1 day, about 1 week, about 1 month, about 3 months, about 6 months, or other predefined periods of time.

At 712, a new diversity value representing a known activity learned by the model, is identified during network monitoring and/or received. The additional diversity value may be the next diversity value in the time series. The additional diversity value is analyzed based on the arranged diversity values, to identify anomalous diversity of the additional diversity value.

The new diversity value is compared to a threshold within a statistical distribution of the diversity time series. Diversity values higher than the threshold are identified as representing an anomaly. Optionally, the threshold is defined as a predefined number of standard deviations above the mean value of the diversity time series, for example, about 1, 2, or 3 standard deviations.

For example, for each temporal sequence of diversity values represented as: $D_T^{t1}(U_i), D_T^{t2}(U_i), \ldots, D_T^{tj}(U_i)$, the mean and standard deviation are calculated and represented as: $\mu_j, \sigma_j$. The next sequential diversity is analyzed based on the relationship:

$$\text{if } D_T^{tj+1}(U_i) > \mu_j + 3\sigma_j$$

then $D_T^{tj+1}(U_i)$ is anomalous

Optionally, at 714, when the additional diversity value represents an anomaly, a message indicative of the anomalous diversity of the new diversity value is generated.

It is noted that the method FIG. 7 may be executed with other methods described herein and/or independently. For example, blocks 704-710 may be executed with block 104 of FIG. 1 to train the model. Block 712 may be executed with block 106 of FIG. 1 to evaluate new activities. In another example, blocks 704-710 may be executed with block 614 of FIG. 6 to update the model. Block 712 may be executed with block 610 of FIG. 6 to evaluate the new activity.

Figure 8:
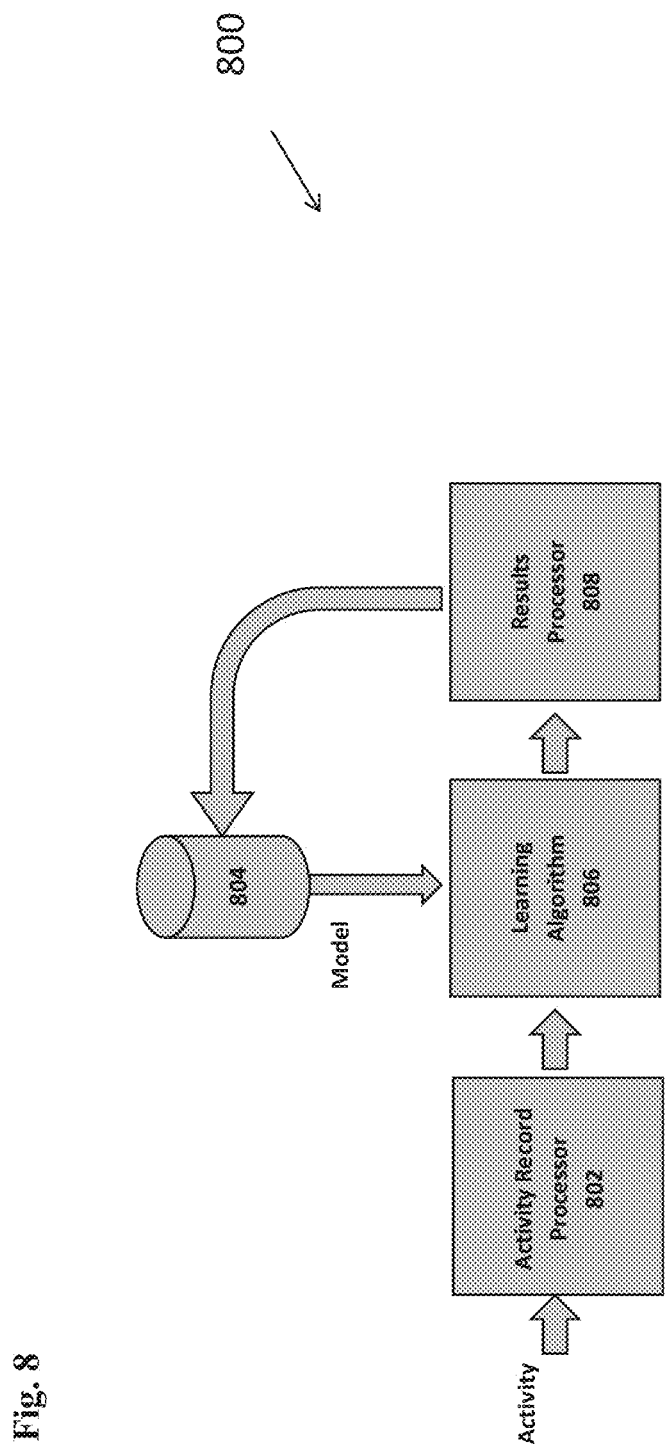
FIG. 8 is a block diagram of an exemplary architecture for implementation of a learning component, in accordance with some embodiments of the present invention.

Reference is now made to FIG. 8, which is a block diagram of an exemplary architecture for implementation of a learning component 800, in accordance with some embodiments of the present invention. The learning component may be, for example, learning server 204 and related module(s).

Learning component 800 includes an activity record processor 802 that monitors and/or receives network activity data (e.g., as described with reference to blocks 602-604 of FIG. 6), and parses the data to generate the activity word (e.g., block 606).

A learning module 806 analyzes the activity word and determines whether the word is within a learned model database 804 (e.g., block 608).

A results processor 808 updates model 804 to include the new activity word when the word is not within the current version of model database 804.

Reference is now made to FIG. 9, which is a block diagram of an exemplary architecture for implementation of an anomaly detection component 900, in accordance with some embodiments of the present invention. The learning component may be, for example, anomaly detecting server 208 and related module(s).

Anomaly detection component 900 includes an activity record processor 902 that monitors and/or receives network activity data (e.g., as described with reference to blocks 602-604 of FIG. 6), and parses the data to generate the activity word (e.g., block 606).

An anomaly detection module 904 accessed by a detection engine 906 analyzes the activity word to determine whether the activity word represents an anomaly, for example, as described with reference to FIG. 4. Engine 906 and/or module 904 access a learned model 910 that includes known normal activities.

When the anomaly is detected, engine 906 generates an alert 908, the alert indicating the identified anomaly. This alert may be provided, for example, stored locally, sent to a user client, and/or sent to another system connected to the network. Alternatively, when the activity word is analyzed to represent normal activity, engine 906 updates learned model 910 with the new normal activity word, for example, as described with reference to block 614 of FIG. 6.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant network entities will be developed and the scope of the term network entity is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for detecting anomalous behavior in a network, comprising:
   receiving, using at least one hardware processor, data representing at least one network activity, each network activity representing a certain data access event occurring between certain network entities;
   extracting from said data representing each respective network activity, the certain network entities involved in the respective network activity;
   retrieving plurality of relevant diversity values from a network behavior model based on said extracted certain network entities, wherein said network behavior model includes relevant diversity values, wherein each respective relevant diversity value represents a certain relationship between at least one network entity and at least one network entity type;
   calculating a first abnormality score using a first combination of relevant diversity values;
   calculating a second abnormality score using a second combination of relevant diversity values;
   wherein the first abnormality score and second abnormality score are different;
   designating a lower of said first and said second abnormality scores as a minimum score, and designating a higher of said first and said second abnormality scores as maximum score; and
   classifying at least one network activity comprises at least one member of the group consisting of: classifying said at least one received network activity as normal when said maximum score is below a predefined threshold, classifying said at least one received network activity as anomalous when said minimum score is above said predefined threshold, classifying said at least one received network activity as normal when the average of said minimum and said maximum score is below said threshold, and classifying said at least one received network activity as anomalous when the average of said minimum score and said maximum score is above said predefined threshold; and
   generating an alert when said at least one network activity is classified as anomalous.

2. The method of claim 1, wherein at least one relevant diversity value is retrieved based on matching at least one network entity extracted from said data of said network activity, to at least one relevant diversity value based on said at least one network entity.

3. The method of claim 1, further comprising:
   receiving data representing said at least one network activity over a period of time;
   retrieving, for each respective time slice of a plurality of time slices of said period of time, at least one relevant diversity value from said network behavior model;
   generating a diversity time series by organizing said at least one relevant diversity value based on chronological sequence of said plurality of respective time slices;
   receiving a new relevant diversity value representing a next relevant diversity value in said chronological sequence of said diversity time series, said new relevant diversity value calculated based on another received network activity; and
   analyzing said new relevant diversity value based on said diversity time series to identify said new relevant diversity value as anomalous or normal relevant diversity value.

4. The method of claim 1, wherein said network behavior model includes respective weights assigned to each respective relevant diversity value and said abnormality score is calculated based on said respective weights assigned to each respective relevant diversity value.

5. The method of claim 1, wherein said retrieving relevant diversity values dependent on a confidence score associated with said relevant diversity values, said confidence score included in said network behavior model.

6. The method of claim 1, wherein calculating said abnormality score comprises calculating based on a member selected from a group consisting of: average of said retrieved relevant diversity values, maximum value of said retrieved relevant diversity values, and a weighted average of said retrieved relevant diversity values.

7. A computer implemented method for generating a model for detecting anomalous behavior in a network, comprising:
   receiving, using at least one hardware processor, data representing a plurality of network activities, each network activity representing a certain data access event occurring between certain network entities;
   extracting from said data representing each respective network activity, the certain network entities involved in said respective network activity;
   calculating plurality of relevant diversity values from said plurality of network activities, wherein each relevant diversity value represents a certain relationship between at least one network entity and at least one network entity type;
   generating a network behavior model based on said calculated plurality of relevant diversity values; and
   outputting said network behavior model;
   calculating a first abnormality score using a first combination of relevant diversity values;
   calculating a second abnormality score using a second combination of relevant diversity values;
   wherein the first abnormality score and second abnormality score are different;
   designating a lower of said first and said second abnormality scores as a minimum score, and designating a higher of said first and said second abnormality scores as maximum score; and
   classifying at least one network activity comprises at least one member of the group consisting of: classifying said at least one received network activity as normal when said maximum score is below a predefined threshold, classifying said at least one received network activity as anomalous when said minimum score is above said predefined threshold, classifying said at least one received network activity as normal when the average of said minimum and said maximum score is below said threshold, and classifying said at least one received network activity as anomalous when the average of said minimum score and said maximum score is above said predefined threshold; and generating an alert when said at least one network activity is classified as anomalous.

8. The method of claim 7, wherein said plurality of network activities is organized into a plurality of groups, each group including network activities having at least one shared network entity type, each group represented by a certain word.

9. The method of claim 8, further comprising associating a certain context with each respective group.

10. The method of claim 9, wherein said certain context is a member selected from a group consisting of: a number of occurrences of activities within the respective group, a time of first occurrence of activities within the respective group, and a time of last occurrence of activities within the respective group.

11. The method of claim 7, further comprising excluding certain network activities matching a predefined context from said network behavior model.

12. The method of claim 11, wherein said predefined context includes a number of occurrences of said respective network activity within a predefined period of time.

13. The method of claim 8, further comprising calculating a confidence score for each respective relevant diversity value, said confidence score calculated based on a number of activities of a certain network entity in the respective group, or a number of activities of a combination of certain network entities in the respective group, said confidence score included within network behavior model.

14. The method of claim 7, further comprising iterating said extracting, said calculating, and said generating, to update said network behavior model, according to at least one of periodically and when new network activities are received.

15. The method of claim 7, further comprising assigning a weight to each respective relevant diversity value, said weights designated based on a predefined logic defining the significance of each respective relevant diversity value based on interaction between network entities.

16. The method of claim 7, wherein said plurality of network activities are received from at least one member of the group consisting of: monitoring of a network, gathering data from network entities, and obtaining data from a source connected to the network.

17. A system for detecting anomalous behavior in a network, comprising:
an anomaly detecting server in communication with said network, said anomaly detecting server implemented by at least one hardware processor configured to:
receive data representing at least one network activity within said network, each network activity representing a certain data access event occurring between certain network entities in said network;
calculate an abnormality score for said received at least one network activity based on a retrieved plurality of relevant diversity values, said plurality of relevant diversity values obtained by extracting from said data representing each respective network activity, the certain network entities involved in the respective network activity, and retrieving said plurality of relevant diversity values from a network behavior model based on said extracted certain network entities, wherein said network behavior model includes plurality of relevant diversity values, wherein each respective diversity value represents a certain relationship between at least one network entity and at least one network entity type;
wherein calculating said abnormality score comprises:
calculating a first abnormality score using a first combination of relevant diversity values;
calculating a second abnormality score using a second combination of relevant diversity values;
wherein the first abnormality score and second abnormality score are different;
designating a lower of said first and said second abnormality scores as a minimum score, and designating a higher of said first and said second abnormality scores as maximum score; and
classifying at least one network activity comprises at least one member of the group consisting of: classifying said at least one received network activity as normal when said maximum score is below a predefined threshold, classifying said at least one received network activity as anomalous when said minimum score is above said predefined threshold, classifying said at least one received network activity as normal when the average of said minimum and said maximum score is below said threshold, and classifying said at least one received network activity as anomalous when the average of said minimum score and said maximum score is above said predefined threshold; and
generating an alert when the at least one network activity is classified as anomalous.

18. The system of claim 17, wherein said anomaly detecting server further includes a trend analysis module configured to:
receive data representing said at least one network activity over a period of time;
retrieve, for each respective time slice of a plurality of time slices of said period of time, at least one relevant diversity value from said network behavior model;
generate a diversity time series by organizing said at least one relevant diversity value based on chronological sequence of said plurality of respective time slices;
receive a new relevant diversity value representing a next relevant diversity value in said chronological sequence of said diversity time series, said new relevant diversity value calculated based on another received network activity; and
analyze said new relevant diversity value based on said diversity time series to identify said new relevant diversity value as anomalous or normal relevant diversity value.

19. A system for generating a model for detecting anomalous behavior in a network, comprising:
a learning server in communication with a network, said learning server implemented by at least one hardware processor configured to:
receive data representing a plurality of network activities within said network, each network activity representing a certain data access event occurring between certain network entities connected to said network;
generate a network behavior model based on plurality of relevant diversity values calculated from said plurality of network activities, wherein each relevant diversity value represents a certain relationship between at least one network entity and at least one network entity type, the certain network entities involved in said respective network activity extracted from said data representing each respective network activity; and output said network behavior model;

calculate a first abnormality score using a first combination of relevant diversity values;
calculate a second abnormality score using a second combination of relevant diversity values;
wherein the first abnormality score and second abnormality score are different;
designate a lower of said first and said second abnormality scores as a minimum score, and designate a higher of said first and said second abnormality scores as maximum score; and
classify at least one network activity comprises at least one member of the group consisting of: classify said at least one received network activity as normal when said maximum score is below a predefined threshold, classify said at least one received network activity as anomalous when said minimum score is above said predefined threshold, classify said at least one received network activity as normal when the average of said minimum and said maximum score is below said threshold, and classify said at least one received network activity as anomalous when the average of said minimum score and said maximum score is above said predefined threshold; and
generate an alert when said at least one network activity is classified as anomalous.

20. The system of claim 19, wherein said learning server is further configured to iterating said generating, to update said network behavior model, according to at least one of periodically and when new network activities are received.

21. A computer program product for detecting anomalous behavior in a network, comprising:
one or more non-transitory computer-readable storage mediums, and program instructions stored on at least one of the one or more storage mediums, the program instructions comprising:
program instructions to receive data representing at least one network activity, each network activity representing a certain data access event occurring between certain network entities;
program instructions to extract from said data representing each respective network activity, the certain network entities involved in the respective network activity;
program instructions to retrieve plurality of relevant diversity values from a network behavior model based on said extracted certain network entities, wherein said network behavior model includes plurality of relevant diversity values, wherein each respective relevant diversity value represents a certain relationship between at least one network entity and at least one network entity type;
program instructions to calculate a first abnormality score using a first combination of relevant diversity values;
program instructions to calculate a second abnormality score using a second combination of relevant diversity values;
wherein the first abnormality score and second abnormality score are different;
program instructions to designate a lower of said first and said second abnormality scores as a minimum score, and designate a higher of said first and said second abnormality scores as maximum score; and
program instructions to classify at least one network activity comprises at least one member of the group consisting of: classify said at least one received network activity as normal when said maximum score is below a predefined threshold, classify said at least one received network activity as anomalous when said minimum score is above said predefined threshold, classify said at least one received network activity as normal when the average of said minimum and said maximum score is below said threshold, and classifying said at least one received network activity as anomalous when the average of said minimum score and said maximum score is above said predefined threshold; and
program instructions to generate an alert when the at least one network activity is classified as anomalous.

22. The computer program product of claim 21, further comprising:
program instructions to receive data representing a plurality of network activities, each network activity representing a certain data access event occurring between certain network entities;
program instructions to extract from said data representing each respective network activity, the certain network entities involved in said respective network activity;
program instructions to calculate plurality of relevant diversity values from said plurality of network activities, wherein each relevant diversity value represents a certain relationship between at least one network entity and at least one network entity type;
program instructions to generate said network behavior model based on said calculated plurality of relevant diversity values; and
program instructions to output said network behavior model.

* * * * *